Figure 1:
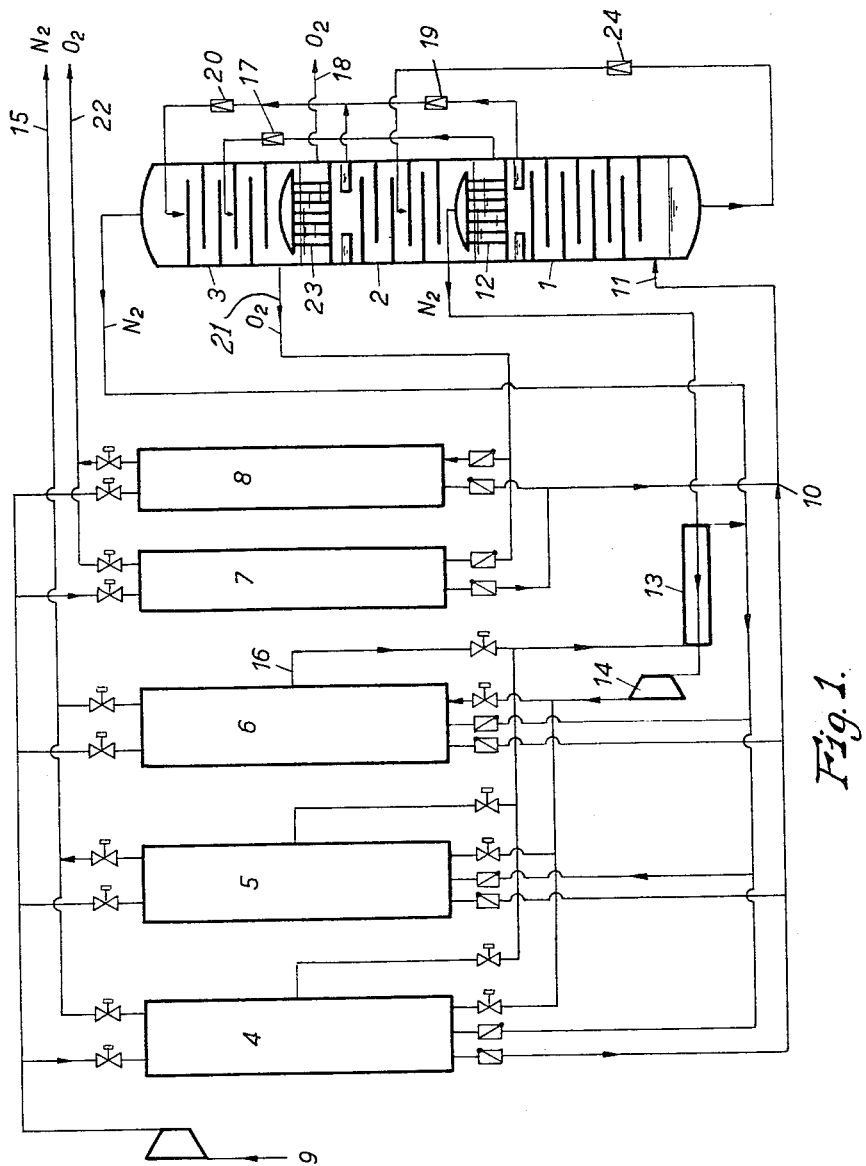

Inventor:
Rudolf Becker,
By Pierce, Scheffler & Parker
his Attorneys

3,091,094
PROCESS OF AND APPARATUS FOR SEPARATING GASES WITH COLD PRODUCTION BY WORK-PRODUCING EXPANSION OF LOW-BOILING PRODUCT
Rudolf Becker, Munich-Solln, Germany, assignor to Gesellschaft für Linde's Eismaschinen Aktiengesellschaft, Hollriegelskreuth, near Munich, Germany, a German company
Filed June 16, 1958, Ser. No. 742,377
Claims priority, application Germany July 4, 1957
5 Claims. (Cl. 62—24)

The present invention concerns a process of, and an apparatus for, separating gas by means of low-temperature rectification, particularly for the separation of air.

The problem underlying the invention consists in increasing the refrigerating capacity, without decreasing the yield. In order to produce the cold necessary for the high yield, particularly for the high yield of liquid oxygen from air, the known air separating plants frequently use an additional nitrogen circuit. Efforts have also been made to increase the refrigerating capacity, and the amount of liquid oxygen, by expanding a large amount of air over a turbine which does not, per se, participate, or only to a minor degree participates, in the separating process. These known measures permit a considerable production of liquid oxygen; but, because of the constantly circulating very large amount of nitrogen or air—used exclusively for refrigeration—they require a great amount of work and entail a large operating cost, and for this reason they are only profitable for extremely large gas separating plants.

According to the present invention the cold expenditure required in the separation of gas, particularly of air, by means of low-temperature rectification is obtained in a simpler manner than heretofore, in that the gas mixture to be separated, particularly air, is first separated at a gas pressure which is higher than usual in a two-stage process—for example, at a pressure between 9 and 12 atmospheres, absolute—and that the low-boiling gas component thus obtained, particularly nitrogen, is removed entirely or partly for refrigeration and work-producing expansion. The higher boiling liquid obtained in this preliminary separation stage is separated, after corresponding expansion, in a two-column rectifying apparatus.

For carrying out the process according to the invention a three-stage rectifying column is provided according to a special design of the subject of the invention, wherein all three columns are connected in series. The second column corresponds to the pressure column of the conventional two-column arrangement for the separation of gas, and is designed in the special case of air separation for operation at about 4½ to 5 atmospheres, absolute. The pressure in the first stage is about 9–12 atmospheres absolute. The same results from the condensation conditions of the condenser between the first and second stages, on the basis of the ratio of condensed nitrogen and the enriched oxygen evaporating in the second stage. The advantage of the arrangement according to the invention is that in plants with a capacity of about 5000–50,000 cubic meters (normal) per hour the amount of gas mixture which can be taken from the first stage and expanded in a turbine is sufficient for covering the cold consumption of the plant by the expansion, and that up to 12% of the amount of oxygen can be produced in liquid form, notwithstanding the optimum oxygen yield.

It heretofore had been suggested to use three-column rectifiers for separating liquid air. However, in the heretofore proposed arrangement the first column was under a pressure of 5.5 atmospheres; the second under a pressure of 2.7 atmospheres; and the last column was under a pressure of 1.5 atmospheres. The liquid nitrogen obtained in the first stage was conducted completely as wash liquor into the head of the last column: thus it was not used—as in the arrangement according to the invention—for the production of cold by work-producing expansion.

Figure 2:
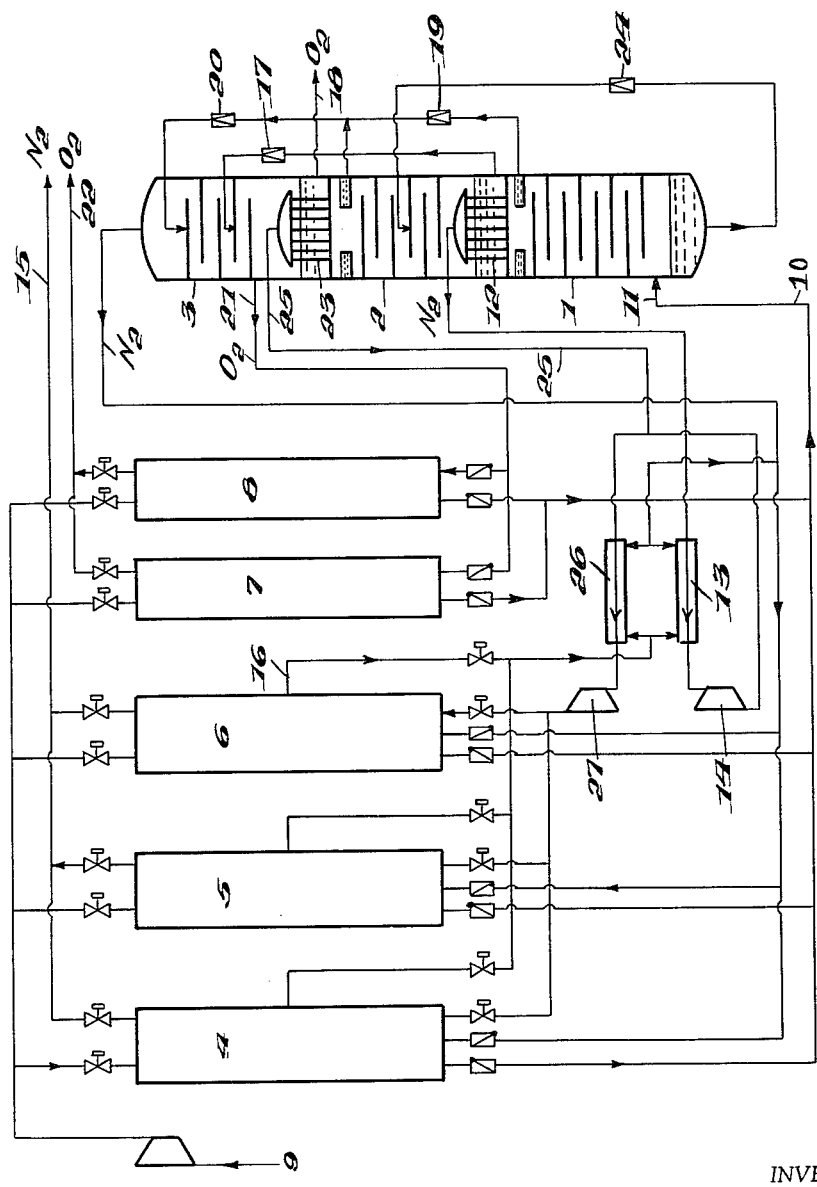

Embodiments of air separating plants for carrying out the process according to the invention are represented in the attached drawing in which:

FIG. 1 is a diagrammatic representation of apparatus embodying concepts of the invention, said apparatus providing for expansion through a single turbine, and FIG. 2 is a diagrammatic representation of apparatus generally similar to that shown in FIG. 1 but differing from the latter in providing for expansion through two turbines in series.

In FIG. 1, 1, 2 and 3 designate three rectifying columns connected in series according to the invention. In the first column 1, there is maintained a pressure of about 10 atmospheres; the pressure in the second column is about 5.5 atmospheres and the pressure in column 3 is about 1.5 atmospheres. 4, 5, 6, 7 and 8 denote regenerators which can be reversed, automatically and/or by hand, by means of their respective valves which are indicated in the drawing by the usual symbols. In particular, the regenerators 4, 5 and 6 operate simultaneously in the same rhythm, while the regenerators 7 and 8 are operated alternately. The method of operation of the plant is as follows:

Air at 10 atmospheres enters the plant at 9, and branches off to the two regenerator sets 4—6 and 7—8. In the represented valve positions the air flows through the regenerators 4 and 7, is cooled there to a temperature of about 108° K., is combined again at 10 and flows at 11 into the sump of the first column 1. In this column the air is separated into a liquid mixture of about 65% nitrogen and about 35% oxygen, and into pure nitrogen in the head of the column. The nitrogen evaporating in the condenser 12, between the columns 1 and 2 from the head of the column 1, is removed there according to the invention and, after heating in an indirect heat-exchanger 13, is expanded in a turbine 14 to about 1.2 atmospheres and thence conducted—with the valves in the represented position—through the regenerator 6 for cooling and simultaneous regeneration and finally discharged at 15. A part of the nitrogen in the regenerator 6 is branched off at 16, and, after recooling in the exchanger 13, is conducted through the regenerator 5 and also discharged at 15.

The sump liquid from the bottom of column 1 is expanded through a valve 24 into column 2 where it is further separated, while a liquid more enriched with oxygen accumulates in the sump of column 2, which enriched liquid is fed through a valve 17, in known manner, to the column 3. The liquid oxygen accumulating in the sump of column 3 is removed at 18. The liquid nitrogen accumulating in the heads of the columns 1 and 2 is expanded through valves 19 and 20 and is fed to the head of column 3 as wash liquor. The vaporous oxygen obtained in the lower part of column 3 is removed at 21 and conducted—with the valves in the represented position—through regenerator 8 and removed at 22. The vaporous nitrogen obtained in the head of column 3 is led off from there and conducted together with the nitrogen arriving from 16 through the regenerator 5.

FIG. 2 corresponds substantially with FIG. 1. In addition, in this plant embodiment, gaseous nitrogen under pressure is passed from condenser 23 through line 25, with which nitrogen the partially expanded nitrogen in turbine 14 is mixed, and then is passed through the heat exchanger 26, likewise heated by nitrogen which is derived from regenerator 6 through line 16. Finally, the mixture is further expanded in turbine 27 to a pressure of about 1.2 atmospheres, and then led through regenerator 6 for cooling and simultaneous regeneration, and exhausted at 15.

The invention is not limited to the embodiment represented here. It is, for example, within the framework of the invention that vaporous nitrogen obtained in the head of column 2, and in the condenser 23, respectively, between columns 2 and 3, is fed to an expansion turbine, if necessary connected in series with the expansion turbine 14, and used additionally for refrigeration. The introduction of liquid nitrogen from column 1 into the head of column 3 can be omitted under certain circumstances, if the production of liquid nitrogen in column 2 is sufficient for the washing process in column 1. It is also possible to carry out the regenerator arrangement in a different manner. Under certain circumstances, it may also be advisible—particularly if larger amounts of air are to be separated or still larger amounts of liquid oxygen are to be produced, or if the plant is to be used for the separation of another crude gas, for example, synthetic gas, coke oven gas, etc.—to employ more than three separation stages, particularly in the form of four or five rectifying columns. In such event it is expedient to select a higher initial pressure and/or a lower pressure in the last stage. Under certain circumstances at least one of the separation processes, preferably the preliminary separation, can be carried out with another separation apparatus, for example, a regenerator arrangement, an expansion turbine and a liquid separator.

I claim:

1. In a process for the separation of a gas mixture by liquefaction and rectification at relatively low temperatures, using a rectifying column arrangement with at least three stages 1–3 and reversing heat exchanging means 4–8 for cooling said gas mixture by heat exchange with separation products; the method which comprises separating the gas mixture in a preliminary first rectification stage 1 at a gas pressure above the pressure customary in a two stage process, particularly between 9 and 12 atmospheres absolute, into a substantially pure fraction of the lower boiling component $N_2$ and a liquid fraction enriched with the higher boiling component $O_2$, withdrawing at least part of said lower boiling component $N_2$ in gaseous form, warming it by heat exchanger 13 in counterflow with at least part of itself in a warm state, expanding said lower boiling component 14 with the production of external work, passing said lower boiling component at least partly through said reversing heat exchanging means 6 to put the lower boiling component $N_2$ in said warm state, using at least a part of the lower boiling component $N_2$ to warm itself by heat exchange in counterflow before said expansion with the production of external work 15 and thereafter passing it through said reversing heat exchanging means 5 transferring thereby cold to the separation process, withdrawing said liquid fraction enriched with the higher boiling component $O_2$ from said preliminary first rectification stage 1, passing it into a medium section of a second rectification stage 2, separating it therein into a substantially pure fraction of the lower boiling component $N_2$ and a liquid fraction enriched with the higher boiling component $O_2$, withdrawing 19, 20 at least part of said lower boiling fraction $N_2$ in liquid form as a washing liquid and passing it into the head of a third stage 3, withdrawing said liquid fraction enriched with the higher boiling component $O_2$ from the lower end of the second stage and passing it into a medium section of the third stage 3, separating it therein into a substantially pure fraction of lower boiling component $N_2$ and a substantially pure fraction of higher boiling component $O_2$, withdrawing the lower boiling component $N_2$ and at least part of the higher boiling component $O_2$ in gaseous form and passing them through said reversing heat exchanging means 5, 8, and withdrawing 22 part of the higher boiling component $O_2$ as a liquid.

2. Apparatus for the separation of a gas mixture in a rectifying column arrangement, comprising an arrangement of cyclical alternated regenerators 4–8 and at least three rectifying columns 1–3 and condenser 12, 23 evaporators 14, 27 interposed between each two columns wherein the first of said rectifying columns is a preliminary rectifying column 1, a gas turbine 14, a valve fitted conduit means connecting the sump 11 of said preliminary column 1 with a medium section of the second column 2, means 17 connecting the sump of the second column with a medium part of the third column 3, valve fitted conduit means 19, 20 withdrawing liquid part of a low boiling fraction from a collector in the head of the preliminary 1 and second 2 columns and passing it to the head of the third column 3, conduit means leading gas from the head of the preliminary rectifying column through a countercurrent heat exchanger 13 to the high pressure side of a gas turbine 14, conduit means communicating between the low pressure side of said gas turbine and a third regenerator 6 of said arrangement of cyclical alternated regenerators 4–8, conduit means 16 leading gas from an outlet between the entrance and the exit of said third regenerator 6 through said countercurrent heat exchanger 13 and through a second regenerator 5 of said arrangement, and conduit means for withdrawing gaseous and liquid products from the last column and for leading the gaseous products through said second regenerator.

3. Process according to claim 1 in which the gas mixture to be separated is air.

4. Process according to claim 1 characterized by the use of a pressure less than atmospheric pressure in the third stage of the process.

5. In a process according to claim 1 the method in which part of the lower boiling component obtained in the preliminary first stage is withdrawn in liquid form and passed to the head of the third stage as a washing liquid.

References Cited in the file of this patent

UNITED STATES PATENTS

| 1,945,367 | Gobert | Jan. 30, 1934 |
| 1,968,518 | Fraser | July 31, 1934 |
| 2,040,116 | Wilkinson | May 12, 1936 |
| 2,048,076 | Linde | July 21, 1936 |
| 2,518,652 | Yendall | Aug. 15, 1950 |
| 2,552,451 | Patterson | May 8, 1951 |
| 2,568,223 | De Baufre | Sept. 18, 1951 |
| 2,673,456 | Scharman | Mar. 30, 1954 |
| 2,715,323 | Johnson | Aug. 16, 1955 |
| 2,817,216 | Etienne | Dec. 24, 1957 |
| 2,825,212 | Linde | Mar. 4, 1958 |
| 2,836,040 | Schilling | May 27, 1958 |
| 2,846,853 | Matsch | Aug. 12, 1958 |

FOREIGN PATENTS

| 859,762 | Great Britain | Jan. 25, 1961 |
| 1,088,991 | Germany | Sept. 15, 1960 |
| 1,184,308 | France | Feb. 2, 1959 |